US00RE44102E

(19) United States
(12) Reissued Patent
Walker

(10) Patent Number: US RE44,102 E
(45) Date of Reissued Patent: Mar. 26, 2013

(54) LOCATION SPECIFIC ALARM RELAY (L.S.A.R)

(75) Inventor: Calvin Walker, Bridgeton, MO (US)

(73) Assignee: Calvin Walker, Bridgeton, MO (US)

(21) Appl. No.: 12/291,991

(22) Filed: Nov. 14, 2008

Related U.S. Patent Documents

Reissue of:
(64) Patent No.: 6,344,799
Issued: Feb. 5, 2002
Appl. No.: 09/370,611
Filed: Aug. 7, 1999

U.S. Applications:
(60) Provisional application No. 60/118,978, filed on Feb. 8, 1999.

(51) Int. Cl.
*G08B 7/00* (2006.01)

(52) U.S. Cl. ..... 340/691.1; 340/506; 340/531; 340/533; 340/534; 340/588; 340/628; 340/286.05

(58) Field of Classification Search ..... 340/691.1, 340/692, 505, 506, 531, 533, 534, 539.1, 340/577, 588, 628, 632, 825.69, 286.05
See application file for complete search history.

(56) References Cited

U.S. PATENT DOCUMENTS

| | | | | | |
|---|---|---|---|---|---|
| 3,716,096 | A | * | 2/1973 | Berrett et al. | 165/209 |
| 3,810,097 | A | * | 5/1974 | Muir et al. | 340/64 R |
| 4,259,548 | A | * | 3/1981 | Fahey et al. | 379/38 |
| 4,422,073 | A | * | 12/1983 | Winner | 340/870.21 |
| 4,670,739 | A | * | 6/1987 | Kelly, Jr. | 340/539.17 |
| 5,349,338 | A | * | 9/1994 | Routman et al. | 340/692 |
| 5,587,705 | A | | 12/1996 | Morris | |
| 5,663,714 | A | * | 9/1997 | Fray | 340/692 |
| 5,724,020 | A | * | 3/1998 | Hsu | 340/286.05 |
| 5,736,927 | A | * | 4/1998 | Stebbins et al. | 340/506 |
| 5,889,468 | A | * | 3/1999 | Banga | 340/628 |
| 5,949,332 | A | * | 9/1999 | Kim | 340/539 |
| 6,144,310 | A | | 11/2000 | Morris | |
| 6,323,780 | B1 | | 11/2001 | Morris | |
| 6,600,424 | B1 | | 7/2003 | Morris | |
| 6,784,798 | B2 | | 8/2004 | Morris | |
| 7,158,040 | B2 | | 1/2007 | Morris | |

* cited by examiner

*Primary Examiner* — Hung T. Nguyen

(57) ABSTRACT

[An indexed database alarm and monitor, for assigning each unit of a multiple unit system a labeled index of pre-selected designations, and or descriptions of use by voice-playback and reporting, by voice-playback of first detecting units designation and or description of use by each unit in the system. Being comprised of the following components, a fire sensor, an alarm IC with piezo horn and detection I/O, a multiple position encoder, a 8-bit dip switch, a radio frequency decoder transmitter and receiver encoder with antenna switch and antenna, a voice-playback device with speaker and a microcontroller all housed within one unit. A complete system being comprised of a plurality of said units, equal to the number of positions on the multiple position encoder, each units multiple position encoders position being different and generating a different index.] *The indexed database alarm and monitor system of the present invention is designed to provide whole house monitoring and whole house reporting of a fire incidence. In the event of a fire incidence a first detecting unit outputs a fixed alarm followed by voice-playback of a user assigned, pre-recorded voice-segment that designates the units installation site and describes its use as a smoke detector, while also transmitting a radio signal that contains a database index to other indexed database alarm and monitor units to activate their fixed alarms and index their voice-playback devices voice-segment database to output the first detecting unit assigned installation site related voice-segment from their installation sites, user assignment of installation site and database index, are provided by a multiple position encoder, each units multiple position encoders control knob position, assigning a different installation site and generating a different database index.*

1 Claim, 2 Drawing Sheets

LOCATION SPECIFIC ALARM RELAY (L.S.A.R)

Matter enclosed in heavy brackets [ ] appears in the original patent but forms no part of this reissue specification; matter printed in italics indicates the additions made by reissue.

This application claims benefit of Prov. No. 60/118,978 filed Feb. 8, 1999.

BACKGROUND OF THE INVENTION

This invention relates to the detection of a fire condition within a residential building, the mapping of a pre-selected group of index, to a related database of pre-recorded voice-playback segments, the transmission, reception and monitoring of index data, and the *reporting of the detection of a fire condition by* output of [a] *an audible* fixed *pattern* alarm [and] *followed by* an index selected voice-playback message *by each unit in the system.*

DESCRIPTION OF PRIOR ART

The prior art is of two types one is the [most] common *smoke detector* you can get them at any hardware store and they are very cheap one of there drawbacks is the limited range of audible alarm, in a large home, one with a basement, first floor and second floor, the chance of hearing an alarm signal from the basement while sleep in a second floor bedroom is slim, as the smoke reaches the first floor your chances are better, but now the first floor is filled with smoke and a wrong turn because you can't tell where the fire actually is could be the end, If you don't wake until you hear the second floor alarm [your] *you* may have to clime out of a window[. Clearly], *clearly* this is not good enough.

The other major type of alarm system is the whole house monitored *smoke* alarm, much more cost and you must pay a monthly fee to be monitored but with these systems all [sensors] *smoke detectors* are linked so that a fire in the basement would cause all alarms to go off so that now your alerted that one of ten detectors has detected smoke, your first question, Where? Which way do I send the kids? Can I put it out myself? Is their time to save anything? *None of these questions will be answered; clearly this is not good enough.* [None of these questions will be answered. Clearly this is not good enough.]

STEBBINS—Audio listen and voice security system U.S. Pat. No. 5,736,927 A security alarm system including multiple zone distributed audio monitors and alarm sensors which report and verify detected alarm and communicate with a system controller and central station.

STEBBINS—requires remote monitoring, and detecting sensor information is not provided on site, also system gives no voice output, and would not be very practical to the average residential user.

KIM U.S. Pat No. 5,949,332 Fire alarm radio transmitter and receiver set. This system transmits information to a remote location that must be monitored.

BANGA U.S. Pat. No. 5,889,468 Extra security smoke alarm system. This system does not provide data about which area of coverage or which sensor has detected the fire condition, it requires a central monitoring unit, and only a general alarm is given.

ROUTMAN U.S. Pat No. 5,349.338 Fire detector and alarm system. Here the recorded vocal warning message or instructions are fixed, the same message will be played back no matter what the location of the fire incidence is.

MUIR U.S. Pat No. 3,810.097 Method and system for visually conveying alarm information. A remote monitored system, where all information is transmitted off site, information is hardwired and not intended for the occupant.

HSU U.S. Pat No. 5,724,020 Voice warning system for fire accidents. System will give fleeing instructions to all people in a building through the loudspeakers. here again instructions are not based on which sensor first detected the alarm.

None of the prior art can be housed within a single unit such as a common smoke detector. None of the prior art allow a common home owner the ability to [change] *assign* system output or configuration. None of the prior art contains *pre-recorded* multiple message databases or *a* pre-selected index *of installation sites.* None of the prior art provide complete system output at each [sensor] *smoke detector* location, also none of the above system can be picked up at a common hardware store and installed by any end user. This system will fill the gap, between the common smoke detector and the costly [full] *whole* house monitored system, and save lives by providing all information available to the occupant.

SUMMARY OF THE INVENTION

*Combining a smoke sensor, an alarm IC with piezo horn and detection I/O, a multiple position encoder, a 8-bit dip switch, a radio frequency decoder transmitter and receiver encoder with antenna switch and antenna, a voice-playback device with speaker and a microcontroller all housed within one unit defines an, "INDEXED DATABASE ALARM AND MONITOR UNIT" A full function system requires two or more identical units.*

By assuming the in home installation sites of the most commonly used smoke detectors, a pre-selected group of installation sites *were chosen and* are listed as *an* index *of the position* labels [on] *of* a multiple position encoder, [(1) if a four position encoder is used] (*10*).

[The index] *If a four position encoder is used the position* labels [or positions] of the *multiple position* encoder [could] *can* be designated with [the labels], GARAGE, BASEMENT, KITCHEN and 2nd FL HALL [(10)]. At each of these positions the *multiple position* encoder produces a unique four-bit binary output, this output will be used by the system [As] *as*, the *database* index of the *position* label.

Once the [index] *position* labels are chosen, a database of *position label* related voice-segments [can be] *are* recorded into [a] *the* voice-playback device, *of each indexed database alarm and monitor unit,* each *voice*-segment [beginning] *starting* at [an] *a database* index mapped *8-bit* address.

[Combining a fire sensor, an alarm IC with piezo horn and detection I/O, a multiple position encoder, a 8-bit dip switch, a radio frequency decoder transmitter and receiver encoder with antenna switch and antenna, a voice-playback device with speaker and a microcontroller all housed within one unit defines an, "INDEXED DATABASE ALARM AND MONITOR." A full function system requires two or more identical units.]

INSTALLATION: on the back (3) of every unit will be an 8-bit dip switch (4) this will be used for the "SYSTEM-ID", set all units to the same code. [Install] *Assign* one unit [at] to each *installation site* location Listed by the *index of position* Labels [on] *of* the *multiple position* encoder (10), *by setting the multiple position encoders control knob* (*1*), *to indicate the labels position in the index of positions* (*10*).

OPERATION: in the event of a fire Incidence, *a first* detecting unit [outputs a] *reports by output of an audible* fixed *pattern* alarm followed by the voice segment *assigned and* "INDEXED" by its multiple position encoder[. At], *and at* the same time, it also transmits a 12-bit radio frequency signal, containing: an 8-bit system ID and the 4-bit *database* index *of the assigned position label to all other system units, this is the only data transmitted or received that is needed to provide the activation of the reporting of a first detecting units assigned installation site by other unit of the system.*

[This is the only data transmitted or received by this system.]

The event of a fire incidence has occurred, now the other units *of the system* receive the *first detecting units* transmitted signal, (50) they validate the 8-bit system ID and apply the *first detecting units assigned* 4-bit *database* index [thur] *thru* a 4-to-8-bit converter (61) to [the] *their* voice-playback [device] *devices* (58).

The "*FIRST* DETECTING UNITS *DATABASE* INDEX HAS BEEN TRANSFERRED" therefore if *the first* detecting units [index] *assigned position* label is basement the [output of] *report given by* the system [unit] *units* installed in the *kitchen, garage, and* second floor hall would be, [a] *an audible* fixed *pattern* alarm followed by, the pre-recorded voice segment "ALERT SMOKE HAS BEEN DETECTED IN THE BASEMENT", *which designates the units installation site as basement and describes its use as a smoke detector.*

*If one of the other units where to be the first detecting unit then the voice message output would be as follows:*

*"ALERT SMOKE HAS BEEN DETECTED IN THE GARAGE" or*

*"ALERT SMOKE HAS BEEN DETECTED IN THE KITCHEN" or*

*"ALERT SMOKE HAS BEEN DETECTED IN THE SECOND FLOOR HALL".*

*Each of these voice messages contain two parts, a description of use related part as in "ALERT SMOKE HAS BEEN DETECTED" and a designation by location part as in, "IN THE SECOND FLOOR HALL". The "description of use" for this embodiment is derived from the inclusion of the fire sensor, the "designation" by location is user assigned from the list of installation sites.*

To the accomplishment of the above and related objects, the invention may be embodied in the form illustrated in the accompanying drawing, attention being called to the fact, however that changes maybe made in the specific construction illustrated and described within the scope of the appended claims.

DETAILED DESCRIPTION OF THE PREFERRED EMBODIMENT

Figure 1:
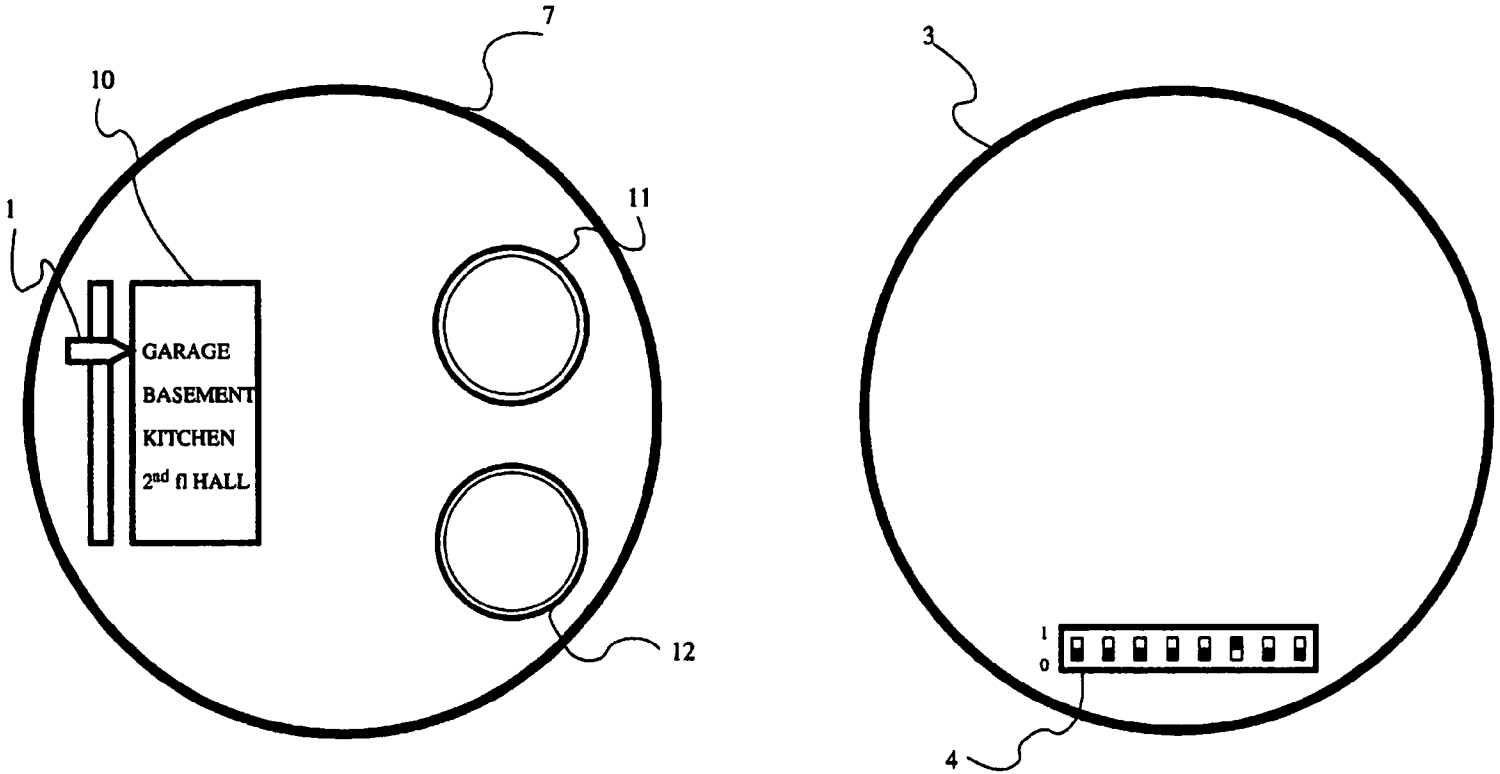
FIG. 1 front and back view of present invention and FIG. 2 is a circuit diagram of the present invention.
Figure 2:
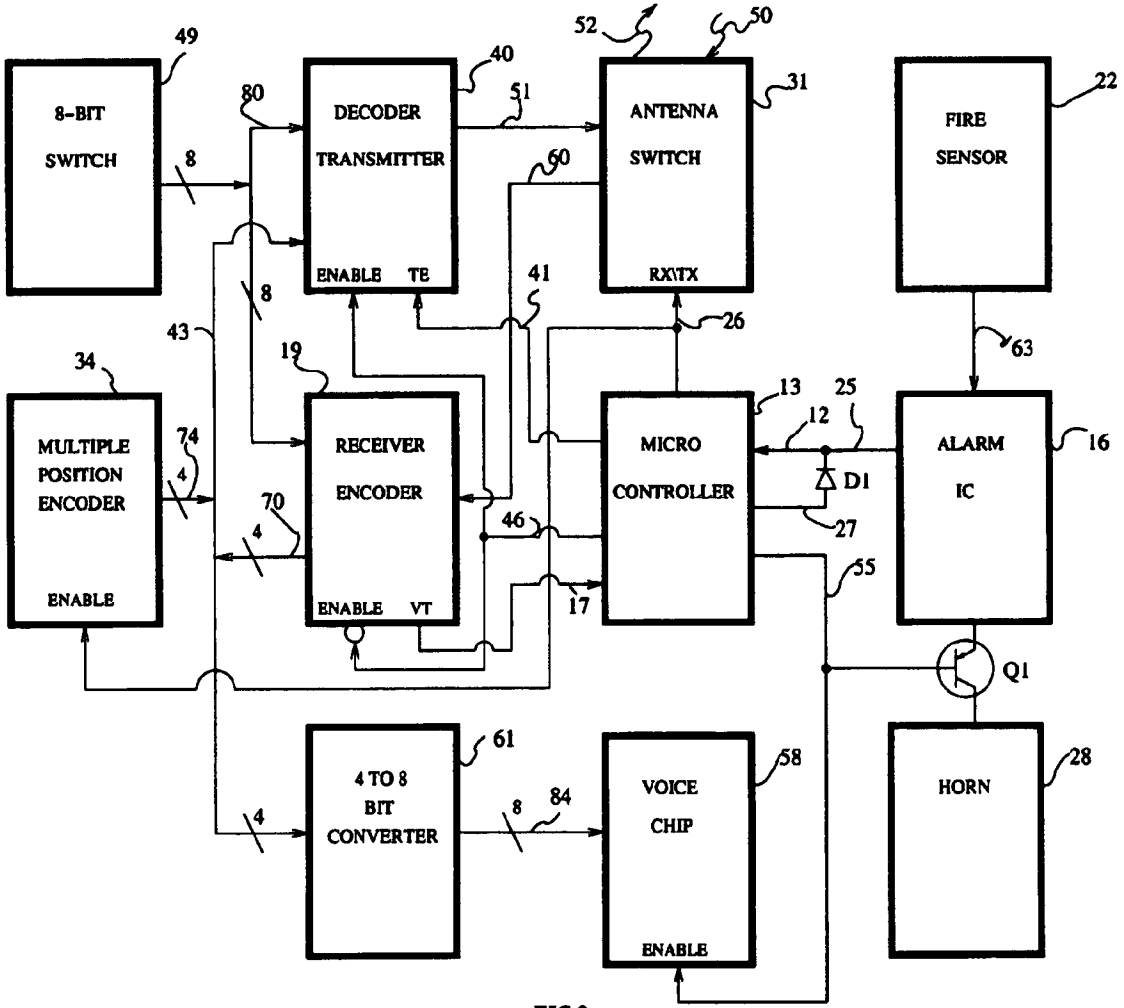

For the purpose of promoting an understanding of the principles of the invention, reference will be made to the embodiment illustrated in the drawings with reference to FIGS. 1 and 2.

The present invention operates as [an embeded-controled] *a microcontroller-controlled*, Interrupt driven, state machine with 3 states.

STATE 1: Initialization.

STATE 2: Monitor.

STATE 3: Interrupt.

STATE 1: Initialization a software function programmed into the microcontroller (13) whereby, all interrupt flags input/output registers and constant values are defined.

STATE 2: Monitor, the microcontroller (13) is in "Sleep State" until an interrupt occurs, the fire sensor (22) and the Alarm IC (16) continuously monitor for a fire incidence, and the radio frequency receiver encoder (19) monitors for a matching system ID.

STATE 3: Interrupt; only two interrupts are possible interrupt-1 "LOCAL ALARM" caused by fire sensors (22) detection of a fire incidence which triggers the Alarm IC (16), in detect mode alarm IC concurrently outputs 5 volts (25) to the microcontroller (13) and begins Horn (28) output.

The microcontroller (13) outputs 5 volts (26) to the antenna switch (31) and enables, the multiple position encoder (34), this causes antenna switch (31) to change from its default assignment, the receiver encoder (19) to the decoder transmitter (40) and puts the multiple position encoders (34) output on the Data Bus (43) the microcontroller (13) then outputs 5 volts (46) reversing the default state of the decoder transmitter (40) off and the receiver encoder (19) on, with the antenna switch (31) set to transmit and the multiple position encoders (34) output, along with the 8-bit dip switch (49) output, applied to the decoder transmitter (40), the microcontroller (13) outputs 5 volts (41) to the transmit enable pin of the decoder transmitter (40) the system ID and INDEX of the label are transmitted (52) to all other system units the microcontroller (13) now enters a delay loop while the Horn (28) output continues along with the decoder transmitter (40) output.

After the delay ends the microcontroller (13) ends output (41) causing end of transmission (52), and then outputs 5 volts (55) which opens Q1 cutting off horns (28) output, and enables voice-chip (58), which begins playback at address given by the multiple position encoder (34) [thur] *thru* the 4 to 8-Bit Converter (61). The microcontroller (13) again enters a delay loop, while voice-chip (58) output continues, after delay ends the microcontroller (13) ends output (55), resets interrupt flag and returns to, "STATE 2" monitor.

Interrupt 2: is a "REMOTE ALARM" caused by receiver encoder (19) receiving (60) a matching system ID and output of 5 volts (17) from receiver encoder's (19) valid transmission pin to the microcontroller (13). The microcontroller (13) disables input (12) then outputs 5 volts (27) [thur] *thru* D1 to the alarm ICs (16) I/O causing alarm IC (16) to enter a detect state and begin horn (28) output, the microcontroller (13) now enters a delay loop, after delay ends, microcontroller ends output (27) alarm IC, (16) no longer in detect state ends Horn (28) output, the microcontroller (13) next outputs 5 volts (55) disconnecting the horn (28) from the alarm IC (16) by opening Q1 and enables the voice-chip (58), staring voice-playback At address supplied by output (70) of receiver encoder (19) [thur] *thru* 4-to-8 bit converter (61) microcontroller (13) again enters a delay loop, after delay ends microcontroller (13) ends output (55), resets interrupt flag and returns to "STATE 2" monitor.

I claim:

1. An indexed database alarm and monitor *system*, for assigning each unit of a multiple unit system, *from* a *position* labeled index of pre-selected designations and or descriptions of use by [a] voice-playback and reporting, *by an audible fixed pattern alarm followed by* said voice-playback *of a* first detecting units *assigned* designation and or description of use by said each unit in the system;

*each said unit* consisting of the following components, a [fire] *smoke* sensor, an alarm IC with piezo horn output and detection I/O, a multiple position encoder, a 8-bit dip switch, a radio frequency decoder transmitter and a receiver encoder, an antenna switch and an antenna, a voice-playback device with speaker, and a microcontroller all housed within one unit;

a complete system being comprised of a plurality of said units, equal to the number of positions, on the multiple position encoder;

*wherein* said multiple position encoder has *said index of* labeled positions and outputs a different 4-bit binary coded decimal at each *said labeled* position to be used as a database index,

*wherein* said voice-playback device contains indexed prerecorded voice segments *with 8-bit starting addresses*, as a database;

*wherein* said labeled positions relate to the indexed *prerecorded* voice segments, and the multiple position encoders, output *at each labeled position* is used as the index into the voice segment database, being mapped one-to-one into [the] *said* 8-bit starting address of a voice segment;

*wherein* said radio frequency decoder transmitter *of said first detecting unit* decodes and transmits a 12-bit signal, consisting of an 8-bit system ID from the 8-bit dip switch, and the 4-bit *database* index from [the] *its said* multiple position encoder,

[the] *wherein said* radio frequency receiver [encoder validates] *encoders of all other units validate* the *transmitted* 8-bit system ID and [outputs] *apply* the *transmitted* 4-bit *database* index *to their said voice-playback devices*; said antenna switch and said antenna default to the radio frequency receiver encoder unless [fire] *smoke* sensor detects smoke, *if smoke detected* said antenna switch is enabled and said antenna is applied to the decoder transmitter;

said microcontroller is used as a state machine and is interrupt driven with 3-states initialization, monitor and interrupt, only two interrupts are allowed interrupt 1-local, said [fire] *smoke* sensor detects smoke, and interrupt 2-remote, said receiver encoder validates transmission of matching said 8-bit system ID.

* * * * *